Figure 1:
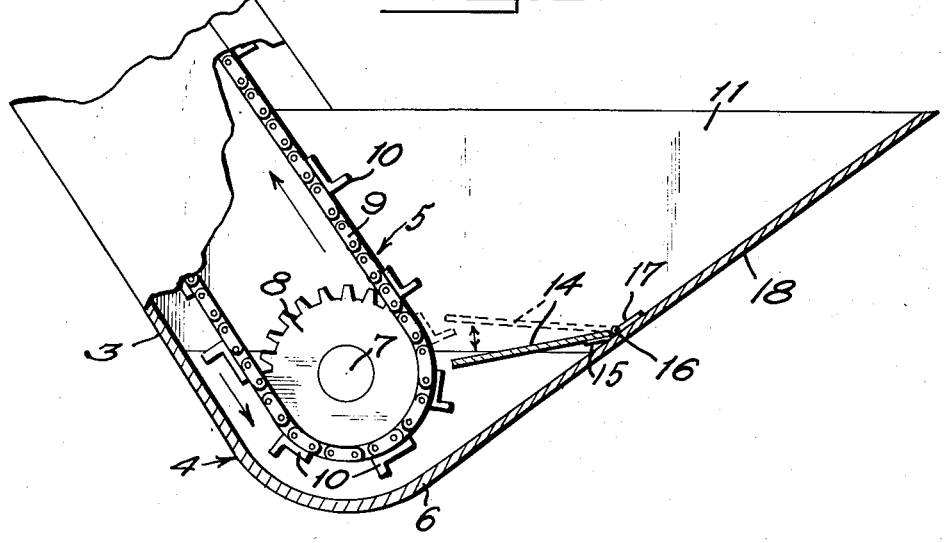

Jan. 8, 1952     T. B. SCHULTE     2,581,720
ATTACHMENT FOR CORN PICKERS
Filed Feb. 28, 1947

Inventor

Theodore B. Schulte

By Randolph & Beavers

Attorneys

Patented Jan. 8, 1952

2,581,720

UNITED STATES PATENT OFFICE 2,581,720

ATTACHMENT FOR CORN PICKERS

Theodore B. Schulte, Dorchester, Iowa

Application February 28, 1947, Serial No. 731,583

1 Claim. (Cl. 198—53)

This invention relates to an attachment for use with conventional corn pickers and more particularly to a shaker attachment adapted to be disposed at the mouth of a hopper from which ears of corn are fed to an elevator adjacent the bottom of the housing thereof.

A primary object of the present invention is to provide a shaker attachment for supporting the corn in the bottom of a hopper and until it is picked up by the elevator or conveyor and which effectively functions to prevent the ears of corn from accumulating in the bottom of the elevator housing and blocking operation of the endless conveyor thereof.

Another object of the invention is to provide a pivotally mounted shaker attachment disposed to be engaged and agitated by each of the buckets or conveyor elements of the elevator whereby the ears of corn disposed thereon will be continuously fed in substantially uniform amounts to the elevator to secure maximum utilization thereof without possibility of overloading or blocking the elevator.

Still a further object of the invention is to provide a shaker feed attachment which is normally inclined downwardly from its pivoted toward its free end and which is rocked upwardly to substantialy a horizontal position by engagement with the buckets or conveying elements of the elevator for agitating the ears of corn and for providing a substantially uniform feeding of the corn onto the elevator while effectively preventing any of the corn from entering the lower end of the elevator housing.

Figure 2:
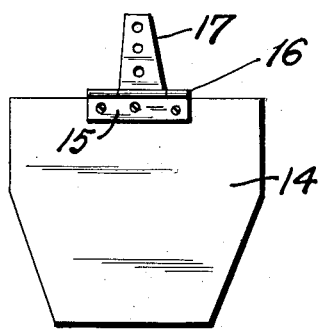

Various other objects and advantages of the invention will hereinafter become more fully apparent from the following description of the drawing, illustrating a preferred embodiment thereof, and wherein:

Figure 1 is a fragmentary view, partly in side elevation and partly in vertical section, illustrating a portion of the elevator and feed hopper of a conventional corn picker and showing the attachment in longitudinal section mounted in an operative position, and Figure 2 is a plan view of the agitator or shaker feed attachment.

Referring more specifically to the drawing, for the purpose of illustrating a preferred adaptation of the invention, hereinafter to be described, the numeral 3 designates generally the lower portion of an elevator of a conventional corn picker, not shown, including a housing, designated generally 4, for containing an endless conveyor, designated generally 5 and constituting the mechanical elevating mechanism of the elevator 3.

The elevator housing 4 is provided with a rounded lower end 6 and a shaft 7 is journaled in the housing 4 transversely thereof and adjacent said end 6 to mount sprocket wheels 8, only one of which is illustrated, over each of which is trained an endless chain 9. The chains 9, only one of which is illustrated, are connected by transversely disposed buckets or slats 10 forming the conveying elements of the elevator 3 and which are disposed on the outer sides of the chains for movement within the housing 4.

The housing 4 is provided with an open upper side, adjacent its lower end above which is disposed a hopper 11 which is adapted to receive the ears of corn after they have been picked and ordinarily after passing through the husking rolls. The walls of the hopper 11 converge toward and merge with the open upper side of the housing 4.

The parts previously described are all of conventional construction and form no part of the present invention. The invention comprises a flap, designated generally 14 and best illustrated in Figure 2 and to the wider end of which one leaf 15 of a hinge 16 is secured. The other leaf 17 of the hinge 16 is fastened to the inclined bottom wall 18 of the hopper 11 for positioning the flap 14 so that it will extend inwardly of the housing 4 and normally rest in its full line position of Figure 1, due to the side edges of the flap 14 bearing against the tapered side walls of hopper 11 when the flap 14 has swung downwardly to its position of Figure 1. The flap 14 is shaped to correspond to the cross sectional shape of the lower portion of the hopper 11 and accordingly the shape thereof may obviously vary depending upon variation in shape of corn picker hoppers with which the invention is employed. The flap 14 is of such a size as to be freely swingable upwardly in substantially a vertical plane within the hopper 11 from its full line position of Figure 1, but yet is disposed sufficiently close to the side walls of the hopper, in its raised, dotted line position of Figure 1, so that ears of corn, not shown, will be prevented from escaping between the side edges of the flap and the side walls of the hopper.

As clearly illustrated in Figure 1, the inner, free end of the flap 14 projects into the housing 4 and into the path of movement of the conveyor elements 10 as they pass around the sprocket wheels 8, so that each conveyor element 10 will engage the under side of the free end of the flap 14 for swinging it upwardly on its hinge 16 from its full line to substantially its dotted line position of Figure 1.

It will thus be readily apparent that the ears of corn discharged into the hopper 11 will be supported on the flap 14 and the inner end of the flap will be disposed in sufficiently close proximity to the endless conveyor or elevator 5 so that the ears of corn cannot escape between the free edge of the flap 14 and the elevator to lodge in the arcuate bottom 6 of the housing 4, which frequently occurs in conventional corn picker elevators and which results in the blocking and stoppage of the endless conveyor. The normal, downwardly inclined full line position of the flap 14 will cause the ears of corn to be conveyed by gravity toward the endless conveyor and as the flap is rocked upwardly be each conveyor element 10 passing thereunder, some of the ears of corn will be discharged off of the free edge of the flap to be picked up by the conveyor element as it disengages the flap. When the flap is thus disengaged it will be returned by gravity from its dotted line to its full line position of Figure 1 for agitating the corn ears and for causing them to roll toward the free edge of the flap and preparatory to being picked up by the next conveyor element 10 when the flap is again raised, as previously described.

It will thus be seen that the attachment, as disclosed in Figure 2 effectively prevents blocking of the elevator 3 and insures a substantially uniform feed of the ears of corn to the endless conveyor thereof.

Various modifications and changes are contemplated and may obviously be resorted to, without departing from the spirit or scope of the invention as hereinafter defined by the appended claim.

I claim as my invention:

In combination with a corn picker elevator including a housing containing an endless conveyor provided with spaced slats and a hopper for receiving ears of corn opening into the housing adjacent the lower end of the housing and which hopper includes an open top and a bottom inclined downwardly from said open top toward the lower end of the housing; a shaker feed attachment comprising a substantially rigid flat plate disposed in the hopper, a hinge connecting one end of said plate to a portion of the inner upper side of the hopper bottom substantially below the open top of the hopper, said plate extending from the hinge toward the housing and having a free end disposed in the housing in the path of movement of the conveyor slats and being supported by the slats above and at an angle to the portion of the hopper bottom disposed below the hinge, said plate being normally inclined downwardly from its hinged end toward its free end and being disposed to swing toward and away from the last mentioned hopper bottom portion and constituting an auxiliary hopper bottom portion adapted to support ears of corn, the free end of said plate being engaged intermittently by the upwardly moving conveyor slats for rocking the plate upwardly to substantially a horizontal position as each of the conveyor slats passes therebeneath for agitating the ears of corn, the free end of said plate being swung downwardly by gravity when disengaged by each conveyor slat for directing the ears of corn off of the free end of the plate and against the endless conveyor to be picked up by the next conveyor slat passing beneath the plate.

THEODORE B. SCHULTE.

REFERENCES CITED

The following references are of record in the file of this patent:

UNITED STATES PATENTS

| Number | Name | Date |
|---|---|---|
| 1,021,201 | Larson | Mar. 26, 1912 |
| 1,273,974 | Woodson | July 30, 1918 |
| 1,702,432 | Furbush | Feb. 19, 1929 |
| 2,065,376 | Kidd | Dec. 22, 1936 |
| 2,438,500 | Hertzler | Mar. 30, 1948 |